March 11, 1930. W. J. KENNEY Re. 17,621
COMBINED FILTER AND UPFLOW WATER SOFTENER
Original Filed May 21, 1927
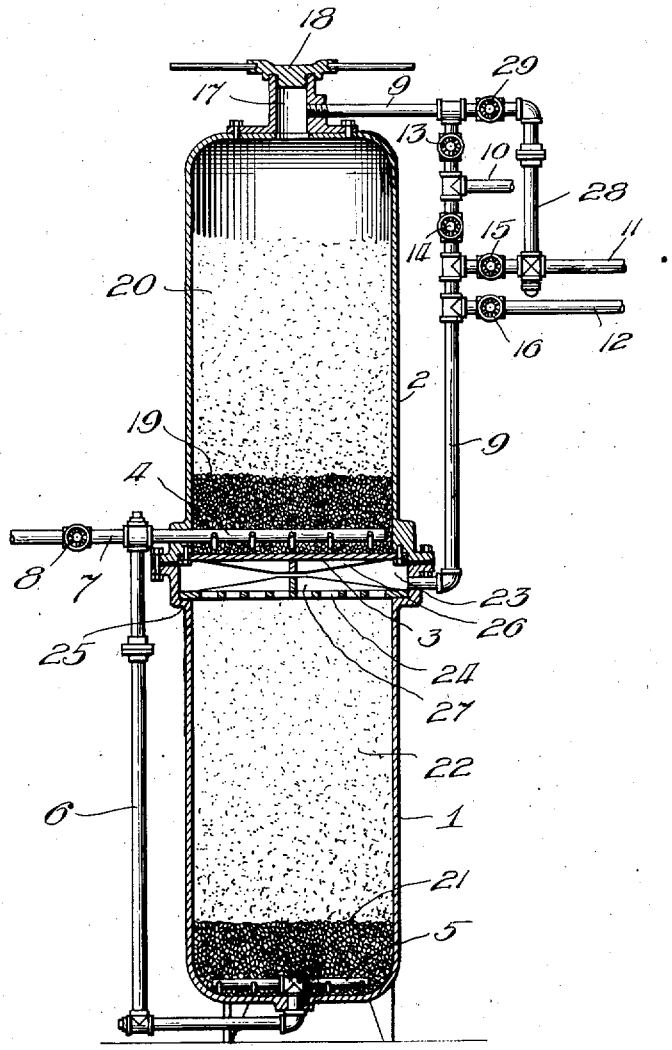
Inventor:
William J. Kenney,
By Wm. F. Freudenreich,
Atty Reissued Mar. 11, 1930

Re. 17,621

UNITED STATES PATENT OFFICE

WILLIAM J. KENNEY, OF CHICAGO, ILLINOIS

COMBINED FILTER AND UPFLOW WATER SOFTENER

Original No. 1,685,818, dated October 2, 1928, Serial No. 193,100, filed May 21, 1927. Application for reissue filed November 26, 1928. Serial No. 322,043.

The present invention relates to so-called zeolite water softeners in which water is softened by passing it through a mineral more or less finely divided. The softening occurs through contact between the water and the surface of the mineral particles and therefore the efficiency of an apparatus increases with the fineness of the particles of the mineral, because the finer the particles, the greater will be the exposed surface available for contact with the water in a given space.

The water to be treated may be passed either upwardly or downwardly through a bed of zeolitic material or mineral but, if the material be very fine, upflow is impracticable because the mineral particles will rise with the water. Therefore if water is to be successfully passed upwardly through a finely divided mineral restraining means must be provided to prevent the mineral from rising. The mineral may be confined by placing above it a screen which need not, however, be pressed tightly down upon the mineral, but may leave a small amount of room for upward movement of the mineral.

There is always more or less dirt or suspended foreign matter in water and therefore dirt or sediment accumulates in the screen or other retaining means of a confined bed, eventually clogging it and restricting the flow of water. Furthermore, it is necessary to regenerate the mineral of zeolite softeners with salt. Since all salt contains more or less insoluble matter and dirt, the screen or retaining means will be clogged directly if the salt is deposited directly upon it at the beginning of a regenerating operation, or will be clogged when the insoluble matter or dirt finally rises through the bed of mineral in the event that the salt is washed up through the bed.

If all the water or brine were effectively filtered before being introduced into the softening chamber, the mineral bed and the confining means therefor would be kept clean and the apparatus would continue to function efficiently. However, any effective filter that has heretofore been proposed has added to the floor space taken up by the softening apparatus, has made installations more costly than they should be, and has made it necessary to give additional care and attention to the apparatus; with the result that very little has been done in a commercial way effectively to filter the water or brine going into small domestic installations.

The object of the present invention is to produce a simple and compact zeolite water softener having a confined bed of mineral and means for insuring that the mineral will be kept clean and that the confining means will not become clogged.

Viewed in one of its aspects, the present invention may be said to have generally for its object to produce a simple and novel combined filter and zeolite softening means.

The various features of novelty whereby my invention is characterized will hereinafter be pointed out with particularity in the claims; but, for a full understanding of my invention and of its objects and advantages, reference may be had to the following detailed description taken in connection with the accompanying drawing which is a vertical central section through an apparatus arranged in accordance with a preferred form of my invention.

Referring to the drawing, 1 and 2 represent the lower and the upper halves of a tank of any desired or preferred size or shape, the tank being usually a cylinder closed at the top and at the bottom. Across the lower end of the upper half of the tank extends an imperforate head 3 that divides the interior of the tank into independent upper and lower chambers. In the bottom of the upper chamber is a water receiving head 4 into which water may enter from a series of points distributed over the bottom of the chamber. In the bottom of the lower chamber is a water distributing head 5. A pipe 6 connects the heads 4 and 5 and, if desired, a branch pipe 7 may be connected to the pipe 6 or to the head 4, the branch pipe containing a manual valve 8. A pipe line 9 connects the tops of the two chambers together. Water may be delivered to the pipe line 9 through a raw water supply pipe 10. Connected to the pipe line 9 are two additional pipes 11 and 12 that are respectively a drain pipe and a service pipe. There are manual valves 13 and 14 in the pipe line 9 on opposite sides of the juncture between the same and the supply pipe 10, the valve 14 being placed between the supply pipe 10 and the pipes 11 and 12. The drain pipe contains a manual valve 15 and the service pipe a manual valve 16.

The tank has an inlet mouth or opening 17 at the top, the same being normally closed by means of a detachable cover 18.

The upper chamber in the tank is partially filled with filtering material, that may consist of a lower deep layer of gravel 19 and a bed 20 of filter quartz overlying the gravel. In the bottom of the lower chamber is a thick layer 21 of gravel or the like upon which is the bed 22 of zeolitic material. The bed 22 does not extend completely to the top of the lower chamber in the tank, so as to leave above the same a compartment 23 for containing softened water. Overlying the zeolitic material is a screen 24, preferably of Monel metal. In the arrangement shown, the tank is enlarged somewhat in diameter at the juncture of the upper and lower halves, thus providing at the bottom of the soft water compartment an annular ledge 25. The screen is laid on this ledge and it need not be otherwise secured. If desired, both the head 3 and the screen may be provided with reinforcing ribs 26 and 27 on the sides directed toward each other; these ribs being of such depth that they will almost touch each other at the middle of the tank, thus preventing the screen from being lifted by an upflow of water. The screen may be in contact with the top of the mineral bed 22, but it is preferably not in firm contact, as I believe it desirable to permit some freedom to the mineral particles at the top of the bed.

Assuming that the apparatus is in operation, water being softened and withdrawn through the service pipe 12 to supply the demand: the valves 14 and 15 are closed and the valves 13 and 16 left open. Water will flow from the supply pipe 10 through the upper portion of the pipe line 9 into the top of the tank and thence down through the filter bed and into the receiving head 4. From the receiving head, the water, freed from impurities than can be filtered out of the same mechanically, flows down through pipe 6 and into the bottom of the tank through the distributing head 5; the water rising through the mineral bed 22 into the small storage chamber 23, being softened during its passage through the mineral bed; and the softened water flows from the chamber 23 into the lower end of the pipe line 9 and thence to the service pipe 12. The gravel in which the receiving and the distributing heads are embedded permits the water to flow or circulate freely in the bottoms of the chambers.

When the mineral is to be regenerated, salt is introduced into the upper chamber through the inlet 17, the valve 15 is opened and the valve 16 closed. Water flows as before into the top of the tank, the dissolved salt being carried with the water down through the filter and up through the softening chamber and thence out to the drain pipe. All insolubles and dirt that may be in the salt are filtered from the brine and left in the upper chamber, so that only a true brine solution enters the bed of mineral to be regenerated. The water is permitted to flow until the brine has all been washed out, and the valves are then restored to ordinary service conditions.

I have shown a by-pass 28 between the pipe line 9 and the drain pipe 11; one end of the by-pass being connected outwardly from the valve 15 and the other end being connected to the pipe line 9 between the valve 13 and the tank. In the by-pass is a manual valve 29. It will readily be seen that the filter may be back-washed through a proper manipulation of the valves by reason of the presence of the by-pass.

It will be seen that my improved softening apparatus as a whole does not require more floor space than does an ordinary softening apparatus of the same capacity but having no effective mechanical filter. Furthermore, the actual height of the tank need not be much greater than those heretofore employed for softening purposes alone, since the mechanical filter need not take up much more space than is ordinarily provided for softened water. It will also be seen that my apparatus is enabled to operate efficiently on the principle of upflow through the mineral bed, without requiring the special attention or care or treatment to insure that the mineral bed will be kept clean and the screen or other retaining means remain unclogged.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. In an apparatus of the character described, a tank divided into an upper chamber and an independent lower chamber, a filtering bed in and only partially filling the upper chamber, a bed of zeolitic material arranged in and extending to within a short distance from the top of the lower chamber, a screen above the zeolitic material, a conduit connecting the bottoms of the chambers together, a second conduit connecting the upper ends of the chambers together; a service pipe, a drain pipe, and a water supply pipe connected to said second conduit; valves in said service and said drain pipe; and valves in said second conduit on opposite sides of said supply pipe.

2. In an apparatus of the character described, a tank divided into an upper chamber and an independent lower chamber, a filtering bed in and only partially filling the upper chamber, a bed of zeolitic material arranged in and extending to within a short distance from the top of the lower chamber, a screen above the zeolitic material, a conduit connecting the bottoms of the chambers together, a second conduit connecting the upper ends of the chambers together; a supply pipe connected to said second conduit, valves in said second conduit on opposite sides of said supply pipe, a service pipe and a drain pipe connected to said second conduit between its connection with the lower chamber and the nearest of the aforesaid valves, and valves in said drain pipe and said service pipe.

3. In an apparatus of the character described, a tank divided into an upper chamber and an independent lower chamber, a filtering bed in and only partially filling the upper chamber, a bed of zeolitic material arranged in and extending to within a short distance from the top of the lower chamber, a screen above the zeolitic material, a conduit connecting the bottoms of the chambers together, a second conduit connecting the upper ends of the chambers together; a supply pipe connected to said second conduit, valves in said second conduit on opposite sides of said supply pipe, a service pipe and a drain pipe connected to said second conduit between its connection with the lower chamber and the nearest of the aforesaid valves, valves in said drain pipe and said service pipe, and a valved by-pass extending from the drain pipe to said conduit at a point between the connection of the latter with the upper chamber and the nearest valve in the conduit.

4. In a water filtering and softening appliance, a tank having chambers therein, in one of which chambers is disposed a filter bed; and in the other of said chambers is disposed a body of water softening material; a valve controlled system of piping in connection with said tank including a water supply pipe, a distributing pipe, and a waste pipe, said system of piping being so arranged that water from the supply pipe may be caused to course successively through the filter bed and water softening body and become expelled through the distributing pipe, or, successively from the supply pipe through the water softening body and the filter bed, and become discharged through the waste pipe, or, successively from the supply pipe through the filter bed and water softening body and become expelled through said waste pipe; and means for introducing into said tank regenerating material for said softening body.

5. In a water filtering and softening appliance, a tank having chambers therein, in one of which chambers is disposed a filter bed; and in the other of said chambers is disposed a body of water softening material; a valve controlled system of piping in connection with said tank including a water supply pipe and a distributing pipe, said system of piping being so arranged that water from the supply pipe may be caused to course successively through the filter bed and water softening body and become expelled through the distributing pipe, or, successively from the supply pipe through the water softening body and the filter bed and become discharged through the distributing pipe; and means for introducing into said tank regenerating material for said softening body.

6. In a water softening appliance a tank having chambers therein, in one of which chambers is disposed a body of water softening material; means for supplying to the other of said chambers regenerating material for said softening body; and a valve controlled system of piping in connection with said tank including a water supply pipe, a distributing pipe, and a waste pipe, said system of piping being so arranged that water from the supply pipe may be caused to course successively through said other chamber and the water softening body and become discharged through the distributing pipe, or successively from the water supply pipe through said other chamber and the water softening body and become discharged through said waste pipe.

7. In a water softening appliance a tank having chambers therein, in one of which chambers is disposed a body of water softening material; means for supplying to the other of said chambers regenerating material for said softening body; and a valve controlled system of piping in connection with said tank including a water supply pipe and a distributing pipe, said system of piping being so arranged that water from the supply pipe may be caused to course successively through said other chamber and water softening body and become expelled through the distributing pipe.

In testimony whereof, I sign this specification.

WILLIAM J. KENNEY.